July 28, 1970     R. E. HOLMES ET AL     3,521,890

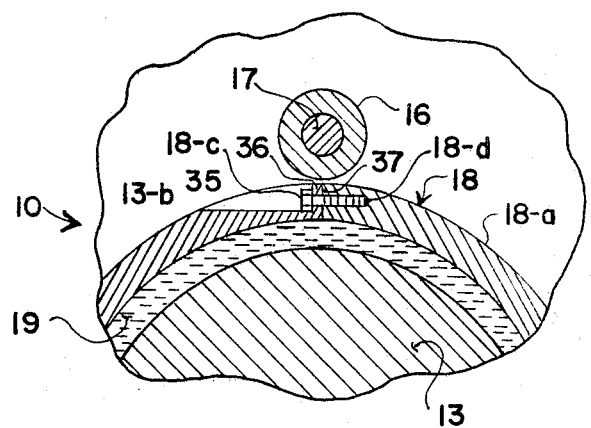
Fig.2
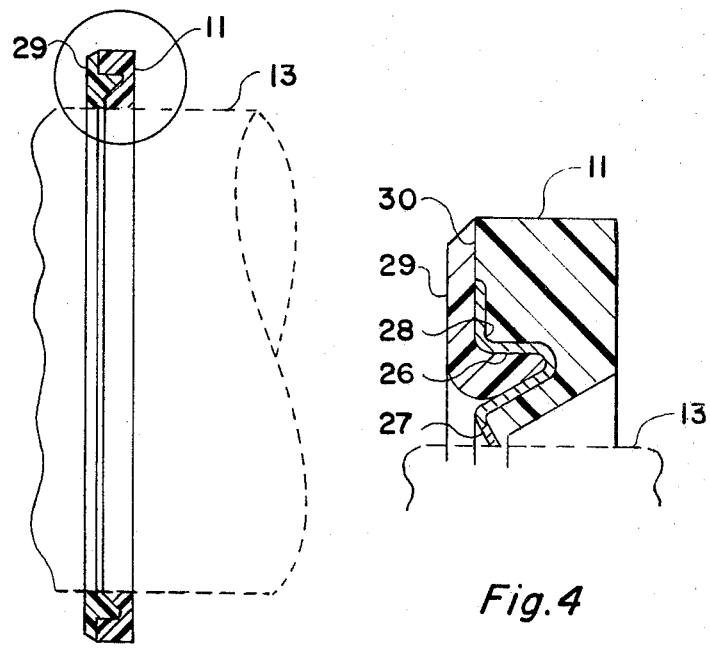
Fig.3
Fig.4

QUICK CHANGE LIP SEAL CARTRIDGE DEVICE

Filed Oct. 7, 1968     3 Sheets-Sheet 3

INVENTORS
R.E. HOLMES
R.O. MARTIN
BY
Thomas W. Brennan

United States Patent Office 3,521,890
Patented July 28, 1970

3,521,890
QUICK CHANGE LIP SEAL CARTRIDGE DEVICE
Robert E. Holmes, Marshall, Tex., and Robert O. Martin, Shreveport, La., assignors to Thiokol Chemical Corporation, Bristol, Pa., a corporation of Delaware
Continuation-in-part of application Ser. No. 536,105, Mar. 21, 1966. This application Oct. 7, 1968, Ser. No. 765,336
Int. Cl. F16i *15/40;* F16k *41/00*
U.S. Cl. 277—35                                                    7 Claims

ABSTRACT OF THE DISCLOSURE

A seal assembly or a cartridge for the horizontal rotating shaft of a mixer or the like includes spaced apart inner and outer lip seal elements disposed about the shaft and retained in a split sleeve shaped to receive the seal elements and a split retainer clamped to a portion of the mixer. The seal elements are resilient, circular in form with at least one discontinuity, and of a construction which induces low friction under run conditions. The space between the elements is provided with coolant from an external source.

---

This application is a continuation-in-part of co-pending application of Robert O. Martin and Robert E. Holmes, Ser. No. 536,105, filed Mar. 21, 1966 for Quick Change Lipseal Cartridge Device.

This invention relates in general to fluid sealing means for use on rotating shaft machinery and the like, and in particular, to sealing means for horizontal shaft mixing machines wherein the shaft ends are inaccessible and high energy viscous materials are stirred or mixed together in large quantities. Mixers contemplated for use with the invention include horizontal solid propellant mixers wherein the seals on the mixing blade shafts are positioned below the level of the viscous propellant batch being mixed (referred to in the art as "submerged" packing glands or seals). In such devices, it is most desirable to use seals which operate at low temperatures and low friction while remaining free of contamination and correspondingly possess a reasonable operating life. Failure to obtain seals possessing the above qualities can result in disaster, since the heat developed, for instance, from rubbing in packing glands and other prior art seals is often great enough to ignite, on contact, the propellant mixture contained in the mixer bowl. Depending upon the propellant quantity, the result is an explosion causing extensive damage to the mixing machinery, other nearby equipment, and even the buildings housing the mixing operations.

Various devices have been utilized in the prior art to accomplish this desirable end sought herein; however, success, if any, has been limited. A prime example is a packing gland comprised of material such as braided jute and the like used in conjunction with stuffing boxes surrounding the rotating shaft and its bearings. This device has performed satisfactorily in general; however, its service life has been found to be relatively short (on the order of 20 hours or less). In addition, it is a relatively high friction seal and therefore, even with coolant impregnation, stringent safety precautions be necesesarily imposed in conjunction with its use. Attempts to reduce operating friction and temperature have been made by impregnating the gland material with an inert liquid substance, for example, the inert liquid polymer used in the propellant mix itself, thereby providing lubrication. However, results were frequently not satisfactory.

Lip seals have also been used and with some success over the devices above described. However, overall performance still remained unsatisfactory from the standpoint of limited service life, the necessity for frequent seal disassembly for inspection and subsequent replacement, and resistance to "trapping" of material being sealed against, within the structure of the lip seals, e.g., the lip seal groove, which in one form or another is usually characteristically present in lip seals.

In normal operation of these machines, periodic maintenance, including disassembly for inspection and subsequent replacement of the sealing devices (if necessary) is usually very time consuming, resulting in much machine idle time and non-productiveness. In attempting to shorten this time, split seal bousings and retaining devices therefor have been used which eliminate the need to expose the shaft ends whereby circumferential seals of the kind contemplated herein might be employed. The invention herein is an improvement in split seals wherein the seal is in the form of an elastomeric material being a ring-like member or element of unique structure, sectioned, as by a mitre, or bias cut, at one or more places, and thereby capable of being slipped over the shaft and placed in its desired position thereon. For purposes of this application such section, mitre or bias cut is a discontinuity in said seal element. Following installation of the seal elements, split metallic members, half-sleeves, or retainers and the like, or formed in segments are installed and fastened together, as by means of bolts or screws.

Accordingly, it is an object of this invention to provide an improved lip seal assembly for rotating shafts of horizontal propellant mixers of the character referred to wherein the lip groove is uniquely filled to prevent entry therein of foreign material while simultaneously maintaining the flexiblity of the lip.

It is yet another object of this invention to provide a lip seal assembly of the character referred to which is easily installed on and removed from shafts having inaccessible ends, maintained and inspected thereon while possessing a significantly longer service life between replacements, is operative at a lower seal temperature and at reduced friction.

These and other objects will become more readily apparent from a detailed perusal of what follows when viewed in conjunction with the accompanying drawings in which:

FIG. 2 is a view of the seal assembly taken along section 2—2 being an enlarged view thereof;

FIG. 3 is a section of the lip seal element installed on a shaft;

FIG. 4 is a view in section and enlarged, of that portion of FIG. 3 within the circle;

Figure 1:
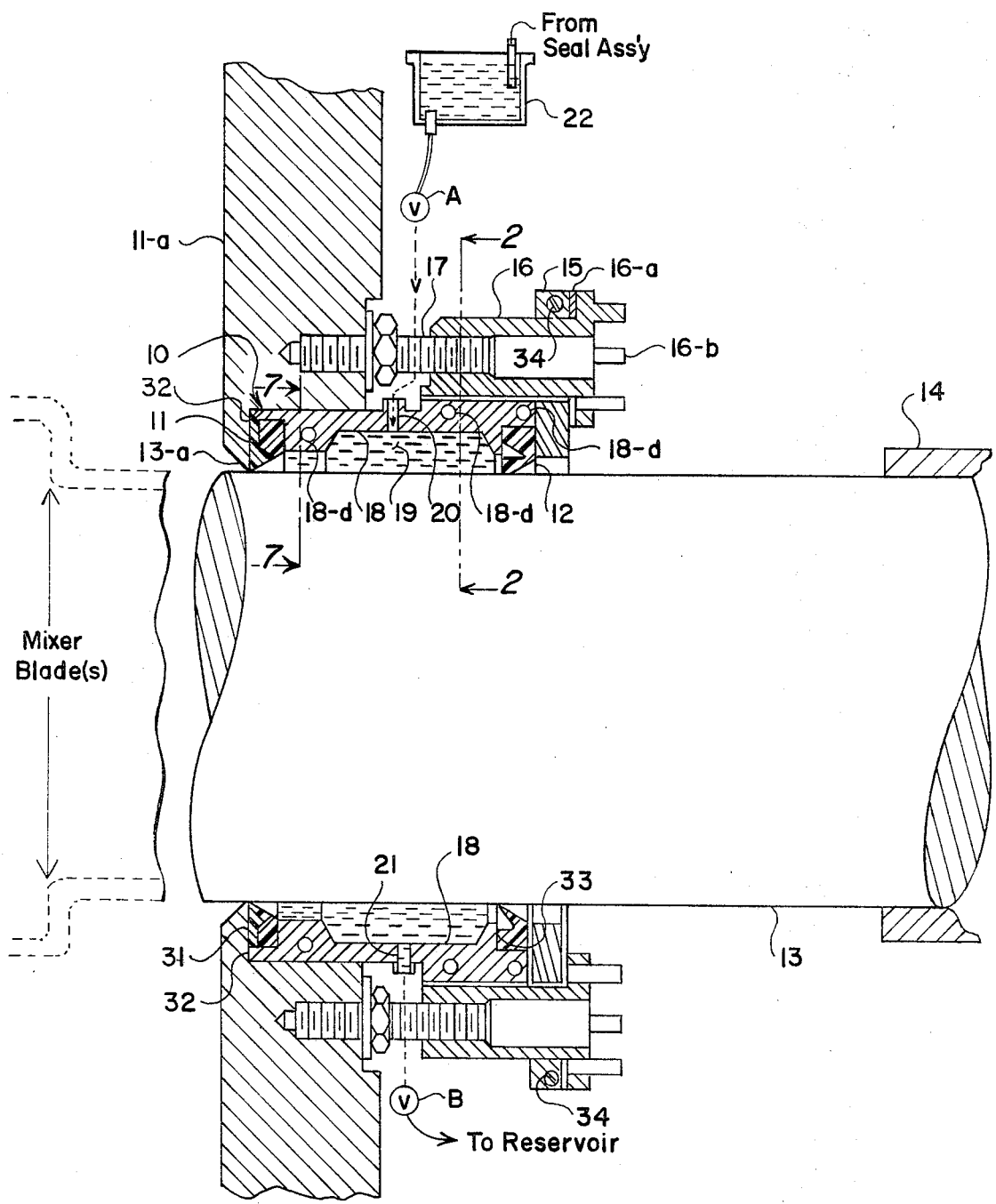
FIG. 1 is a sectional view of one side of a horizontal propellant mixing machine illustrating the seal assembly of the invention in its preferred embodiment.

Referring to the drawings, and in particular to FIG. 1, there is shown a seal cartridge assembly 10 comprising an inner seal element 11 and an outer seal element 12. Cartridge assembly 10 is positioned on a rotating shaft 13 which is attached to a blade or set of blades indicated in FIG. 1 by the dashed lines to the left, after passing through a perforation 13–*a* in the mixing bowl 11–*a*. These blades in the usual case extend to the left, traversing mixing bowl 11–*a* (one side of which is indicated in FIG. 1), which contains viscous fluid and the like, to be mixed to produce, for example, a solid propellant. The blade or blades terminate at the left being attached to an end shaft which is the continuation of shaft 13 and passes through an additional perforation 13-a in mixing bowl 11-a to an end housing (not shown) which is surrounded by an additional seal assembly similar in all respects to seal assembly 10 except being a mirror image thereof. This portion, being a duplicate in all essential respects, is omitted for purpose of clarity.

To the right of FIG. 1, shaft 13 is fitted with support bearings housed in the indicated structure 14. A similar bearing and housing structure is contained at the opposite or left hand side of mixing bowl 11-a.

As indicated above, elements 11 and 12 are part of assembly or seal cartridge 10, which includes, in addition to elements 11 and 12, a split sleeve 18 (see also FIGS. 2 and 7) comprising a pair of matching halves 18-a and 18-b, and a similarly split retainer 15. Sleeve 18 is assembled over shaft 13, fastened together by screws 18-c, FIGS. 2 and 7, and is shaped internally so as to define together with a portion of the outer periphery of shaft 13, a clearance cavity or chamber 19. The walls of sleeve 18 are fitted with a pair of fluid fittings 20 and 21 (FIG. 1), whereby fluid from an external reservoir 22 for lubricating and cooling purposes is conducted through suitable fluid conductors under a slight positive pressure to cavity 19.

Figure 7:
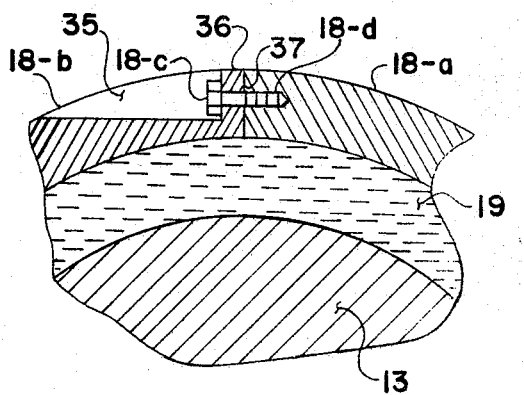
FIG. 7 is a view in section taken along the section line 7—7 of FIG. 1.

FIGS. 2 and 7 depict a preferred manner in which sleeve halves 18-a and 18-b are joined together. One of the sleeve halves, in this instance 18-b, is cut back at its periphery to form a recess 35 and a shoulder 36 which is drilled to provide a hole for passage therethrough of one of screws or bolts 18-c. Shoulder 36 abuts the end face 37 of sleeve half 18-a which is provided with a tapped hole to receive in fastening engagement therewith screw or bolt 18-c.

In FIGS. 3 and 4 there is indicated detailed views of the improved lip or inner seal element 11 of this invention. Seal element 11 comprises a lip 27 (FIG. 4) and a groove 28 and corresponds to seal element 12 (FIG. 1). Both seal elements 11 and 12 preferably include a spring member 26 for support. In seal element 11, and this is the heart of the invention, groove 28 is shown filled with a foamable substance 29, preferably a flexible polyurethane resin of a density on the order of four pounds per cubic foot. In this aspect of the invention, it has been found advantageous to mold foam filler 29 not only in groove 28 and over spring member 26, but also substantially over the face 30 of seal element 11 as well. The preferred thickness of foam material 29, in this instance polyurethane, on face 30 has been found to be on the order of about 0.05 inch for best performance in a solid propellant mixer application. Other applications will no doubt require other thicknesses and even other foamable materials, depending in great measure upon the materials being mixed in mixing bowl 11-a.

In addition to the polyurethane filler 29, it is sometimes advisable to apply an additional coating of a liquid rubber or other polymer on the outer surface thereof to enhance its sealing and lubricating qualities. A particularly effective material for this purpose is a coating of ambient cure, translucent or transparent silicone rubber manufactured by the General Electric Company. This material is resilient, bonds well to urethane, and has good tensile strength, whereas bonding ability to the nitrile buna-n material of which elements 11 and 12 are usually made is relatively weak.

Figure 5:
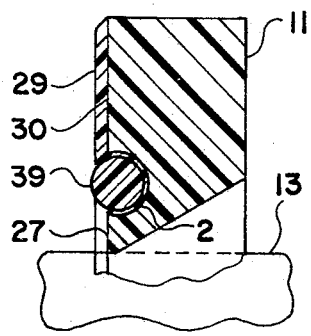
FIGS. 5 and 6 are views of alternate embodiments of the seal element shown in FIG. 4.
Figure 6:
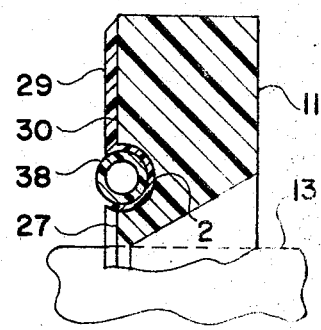

Other materials and devices found useful in varying degree for use as filler 29 materials include the following:

(1) An ordinary rubber tubing 38, hollow as in FIG. 6 or solid as tubing 39 in FIG. 5, positioned in groove 28 and bonded therein by a suitable adhesive such as polysulfide.

(2) Sponge rubber bonded in groove 28 by adhesive (not shown) which can be selected for the solid tubing 39 in FIG. 5.

(3) Room temperature vulcanizing (RTV) silicone rubber foam.

Figure 8:
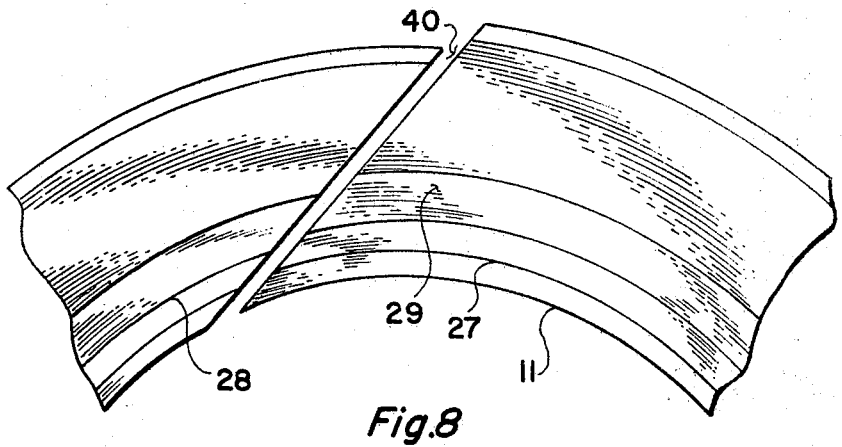
FIG. 8 is a view of the lip seal element of FIGS. 4, 5 and/or 6 showing a discontinuity in the seal element to enable installation thereof over a mixer shaft.

In operation of the invention, reference should be had to FIG. 1 and FIG. 8 wherein shaft 13 is considered to be rotating and seal cartridge 10, together with its component parts is installed thereon in accordance with the following procedure as an example.

Inner lip seal element 11 is opened by spreading it apart at its point of separation or discontinuity 40 (see FIG. 8) and positioned on shaft 13 with seal face 30 coated filler 29 contacting mixing bowl 11-a wall recess 31. Sleeve 18 is then assembled on shaft 13 by positioning each of its halves 18-a and 18-b thereon and fastening them together by screws or bolts 18-c in threaded holes 18-d (three shown in FIG. 1) in sleeve half 18-a. Assembled sleeve 18 is then moved to the left insuring that the projecting portion 32 covers the outer periphery of seal element 11. Seal element 12 is then positioned on shaft 13, as was seal element 11, and moved into the annular groove 33 of assembled sleeve 18, with seal groove 28 preferably facing the direction shown in FIG. 1. Incidentally, seal element 12 groove 28 may also be constructed with filler material 29 therein similar to seal element 11, although in most instances an unfilled groove seal element is satisfactory. After installation of seal element 12, retainer 15 is installed in place on shaft 13 in a manner similar to sleeve 18 with its halves fastened together by bolts or screws (not shown) in threaded holes 34 (see FIG. 1).

With retainer 15 installed, clamps or knobs 16 together with their washers 16-a are screwed on studs 17 and tightened until a predetermined desired compressive load is applied to seal elements 11 and 12 and the entire cartridge assembly 10 completing the installation. Clamps or knobs 16 include splines 16-b for tightening with a special wrench or other tool adapted for the purpose.

As a final step in assembling of the invention, fluid preferably liquid, which is compatible with both the propellant mixture in the mixing bowl and the seal element 11 and 12 material, is permitted to enter the cavity 19 between sleeve 18 and shaft 13 through port 20. By means of inlet valve A and outlet valve B, the entire volume of cavity 19 is completely filled with fluid by bleeding it, in the direction indicated by dotted lines in FIG. 1, through outlet fitting 21 and back to reservoir 22. After insuring cavity 19 is completely filled with fluid, valve B is closed. Valve A can be left open to permit expansion of the fluid without over pressurizing cavity 19, providing, of course, reservoir 22 pressure is suitably regulated. In the usual operation, fluid in chamber 19 is at a slight positive pressure to (a) assist seal element 11 in preventing any of the propellant mix from bowl 11-a entering cavity 19 and thus causing explosive damage therein and (b) to act as a lubricant for seal elements 11 and 12 during rotation of shaft 13. In this latter respect a slight leakage into mixing bowl 11-a past seal 11 is not only tolerated, but in most instances is desirable.

As stated hereinabove, improved lip seal element 11 is preferably used for its sealing purpose as the inner seal, since lip type seals without the improved groove 28 filler material 29 are either ineffectual or quite unsatisfactory in preventing trapping as above noted. Reasons for this are that the clearances between shaft 13 and the mixer housing are such that lip 27 must be sufficiently stiff to prevent it or a portion thereof from entering these spaces. The invention herein described has been found to materially resist this type of action and has resulted in extending operating times up to twice the number of hours between recommended replacements. Also, cooler seal operation and reduced friction has accompanied its use, thereby mitigating a hazardous contingency always present when mixing solid propellant batches. In this last regard, seal elements 11 and 12 and, in fact, entire cartridge assembly 10, have been shown to be capable of operating at a 10 to 20% decrease in temperature as compared to other seal arrangements above mentioned.

Having described the invention in its preferred use and embodiment, it should not be construed as limited thereto, but in fact, has other uses which will occur to the skilled artisan upon becoming acquainted with its unique characteristics and such uses are contemplated. Limitations to be imposed should be considered applicable only in the light of the subtended claims.

What is claimed is:

1. A seal assembly adaptable for mounting on a horizontal rotating shaft wherein the ends of said shaft are inaccessible, comprising a split sleeve assemblable around said shaft having a pair of outer and one inner recesses; a resilient sealing element in each of said outer recesses each having an annular groove radially inwardly of the periphery thereof and at least one discontinuity for installing said sealing element on said shaft, a lip on the inner periphery of said elements sealingly contacting said shaft, a seal face on said sealing elements radially extending from said grooves, said outer recess in said sleeve adaptable to receive in sealing engagement therein the outer surfaces of said sealing elements and for spacing said sealing elements apart; said sleeve comprising at least two matable portions adaptable for assembling on said shaft, means for fastening said portions together on said shaft, said assembled sleeve its inner recess defining with a portion of said shaft peripheral surface an annular space therebetween, means on said sleeve for admitting fluid under pressure from an external source into said annular space, means on said sleeve for permitting said fluid to flow out of said annular space, means for retaining said sleeve and said elements on said shaft, and at least one resilient material adhesively bonded to at least one of said sealing elements on said seal face thereof and substantially filling said groove.

2. The seal assembly of claim 1 wherein the material adhesively bonded to said seal face of said element and filling said groove is selected from the group consisting of foamed polyurethane, foamed silicone and sponge rubber.

3. The seal assembly of claim 2 wherein the groove filling material is a discontinuous hollow rubber tube.

4. The seal assembly of claim 2 wherein the groove filling material is a solid rubber tube.

5. The seal assembly of claim 1 wherein the material adhesively bonded to said seal face and in said groove is foamed polyurethane.

6. The seal assembly of claim 1 wherein the material adhesively bonded to said seal face and in said groove is foamed silicone.

7. The seal assembly of claim 1 wherein said sealing element further includes a reinforcing spring member molded into said groove, and said resilient material in said groove is adhesively bonded thereto.

References Cited

UNITED STATES PATENTS

| | | | |
|---|---|---|---|
| 845,701 | 2/1907 | Moore | 277—66 X |
| 1,404,299 | 1/1922 | Joyner | 277—35 |
| 2,049,774 | 8/1936 | Hoffman | 277—66 |
| 2,340,022 | 1/1944 | Shellenberger | 277—72 X |
| 2,565,923 | 8/1951 | Hrdlicka | 277—64 |
| 2,866,670 | 12/1958 | Harris et al. | 277—165 X |
| 3,164,420 | 1/1965 | Cramer | 277—59 X |

SAMUEL ROTHBERG, Primary Examiner

U.S. Cl. X.R.

259—1; 277—59, 66, 165